(12) United States Patent
Miller

(10) Patent No.: US 9,250,017 B2
(45) Date of Patent: Feb. 2, 2016

(54) MAGNET SUPPORTED ROTARY DRUM DRYER

(71) Applicant: Jerry D. Miller, Louisville, KY (US)

(72) Inventor: Jerry D. Miller, Louisville, KY (US)

( * ) Notice: Subject to any disclaimer, the term of this patent is extended or adjusted under 35 U.S.C. 154(b) by 481 days.

(21) Appl. No.: 13/815,958

(22) Filed: Mar. 18, 2013

(65) Prior Publication Data

US 2013/0283632 A1   Oct. 31, 2013

Related U.S. Application Data

(60) Provisional application No. 61/685,345, filed on Mar. 16, 2012.

(51) Int. Cl.
*F26B 25/16* (2006.01)
*F26B 11/02* (2006.01)

(52) U.S. Cl.
CPC ............... *F26B 25/16* (2013.01); *F26B 11/022* (2013.01)

(58) Field of Classification Search
CPC .............................. F26B 25/16; F26B 11/022
See application file for complete search history.

(56) References Cited

U.S. PATENT DOCUMENTS

| | | | |
|---|---|---|---|
| 4,295,803 A | 10/1981 | Barthelmess | |
| 4,471,331 A | 9/1984 | Wyatt | |
| 5,530,306 A | 6/1996 | Ueyama | |
| 5,594,289 A | 1/1997 | Minato | |
| 6,617,722 B2 | 9/2003 | Ooyama | |
| 6,731,038 B2 | 5/2004 | Kuipers | |
| 6,809,449 B2 | 10/2004 | Shinozaki | |
| 7,075,200 B2 | 7/2006 | Minato | |
| 2002/0036435 A1 | 3/2002 | Ooyama | |
| 2005/0046285 A1 | 3/2005 | Minato | |
| 2007/0080595 A1 | 4/2007 | Akiyama | |
| 2010/0013332 A1 | 1/2010 | Vollmer | |
| 2015/0033804 A1* | 2/2015 | Fukui | D06F 37/22 68/140 |

FOREIGN PATENT DOCUMENTS

IT         MI942489 A1  *  6/1996

OTHER PUBLICATIONS

Paden, et al. Design Formulas for Permanent-Magnet Bearings, Transactions of the ASME, Dec. 2003, pp. 734-738, vol. 125.

* cited by examiner

*Primary Examiner* — Jiping Lu
(74) *Attorney, Agent, or Firm* — Carrithers Law Office, PLLC

(57) ABSTRACT

A rotary drum dryer is supported by magnetic non-contact bearings rather than by rollers or wheels which are normally used to support a rotary drum cylinder. A plurality of rare earth permanent magnets are positioned on the outside surface of the cylindrical dryer to form at least two external annular rings. One U-shaped semi-circular channel supported with a cradle have similar rare earth permanent magnets positioned at selected locations on the inside curvature thereof with the open end facing upward and disposed below in alignment with and spaced apart from each one of the at least two annular rings of magnets supporting the on the cylindrical dryer. The like pole magnets affixed to the surface of the cylinder repel the like pole magnets facing them disposed in the U-channels of the cradle causing the cylinder to levitate above and spaced apart a selected distance from the cradle.

5 Claims, 7 Drawing Sheets

MAGNET SUPPORTED ROTARY DRUM DRYER

TECHNICAL FIELD

The present invention relates to the field including bearings, rollers and non-contact support for rotary dryers and drums.

BACKGROUND OF THE INVENTION

Rotary devices such as rotary dryers, drums, trommels and tumblers, for example, are well known in industry. Such devices are used for drying, mixing, separating, or milling of different materials such as ores, fibers, or vegetative materials such as tobacco. (A trommel is a revolving cylindrical sieve used for screening or sizing rock or other particulate into different size groups.) These units typically include a long cylinder which is positioned with the axis lying horizontally or slightly tilted to cause loose material within to migrate from the input end to the output end of the cylinder. Both ends of the cylinder are typically open. The cylinder is caused to spin on an axis and preferably has shallow spiraling fins or a similar structure attached to the inner wall of the cylinder, resembling internal threads, for the movement of loose material from the higher input end to and out of the lower discharge end. Due to the use of internal spiraling ribs or fins, the axis of drum rotation is perfectly or nearly level in some configurations.

The material to be processed is added into the higher end. As the cylinder spins, the material is carried upward within and against the walls and internal spiral ribs or fins and drops back to the bottom of the cylinder, but due to the configuration of the spiraling fins and the slight tilt of the cylinder, the material falls ever closer to the lower end of the cylinder. In a drying drum, while the material is dropping toward the lower end, drying air, steam or the like, is passed through the cylinder to dry the process material dropping and passing through the drum. In a ball mill, heavy, hardened balls drop along with the process material to be milled, such that as the balls fall on and against the process material, the process material is crushed or pulverized. In a mixing drum, differing ingredients are added simultaneously to the input end of the drum and these are uniformly mixed as they exit the lower end of the drum.

The preceding discussion describes a continuous flow process. However, instead of a process wherein material is continuously added into the input of the cylinder and finished product continuously falls out of the output end, a 'batch' processing unit is also possible. Such a unit has is preferably a closed cylinder with at least one door which is opened to put material in the cylinder. The material is processed and then the door or doors are opened to remove the processed material.

Rotary drums vary from a few feet in length and diameter to over a hundred feet in length and tens of feet in diameter. These drums can weigh from a few hundred pounds to tens or hundreds of tons. A common problem with such drums is the means of support on which the drums spin. Typically, the drums are supported by wheels or rollers configured within semi-circular cradles which allow the drums to spin. The rollers contact the drum on strengthened and hardened annular external rings on the outer walls of the drum. Additionally, in some cylinders, an axle with some type of bearings may support or help to support a spinning cylinder.

In many industrial environments, the materials to be processed are abrasive and through contamination and abrasion, cause failure of the roller surfaces and the bearings in the rollers. Larger and heavier drums require larger and heavier rollers with larger and heavier bearings. When bearings or rollers fail, the rotary drum must be emptied and shut down to repair or replaced the failed part. When such failures occur, expensive parts must be replace. Further, downtime causes significant expense as well. Another expensive characteristic of such industrial cylinders is that mechanical bearings need lubrication which may also inadvertently contaminate process material.

Conventional rotary drum dryer (usually a large cylinder having steam coils inside) supported on bearings held in cradles. Particular matter such as grain or other granular material is tumbled from one end of the dryer to the other to dry or mix the particles. These dryers can weight tons and take large electric motors to turn.

The present invention utilizes a plurality of permanent magnets affixed around the outside diameter of the drum dryer at selected locations. A cradle having permanent magnets of a reverse polarity support the dryer. The dryer is supported and suspended above the magnets mounted in the cradle eliminating any frictional drag or bearings. The axial ends of the drum dryer include a metal cap or pole in magnetic engagement with a magnet extending from a support.

The drum dryer can be rotated by conventional electric motor and gear or belt means; however a preferred embodiment uses a plurality of magnets extending from a wheel mounted to a electric motor shaft which are in magnetic communication with a plurality of magnets mounted to and extending from the periphery of the distal end of the drum at selected spacing so that rotation of the motor turns the motor magnets magnetically coupled to the drive magnets mounted on the end of the dryer to rotate same.

DESCRIPTION OF THE RELATED ART

As discussed above, wheels and rollers are commonly used to support industrial cylinders used in rotary dryers, mixers, and tumblers and other industrial situations wherein cylinders are used. Inherent disadvantages in this type of support mechanism include: the inefficiency due to friction in the wheels, rollers and bearings, the expense due to necessary lubrication, cleaning and maintenance, the possible contamination caused by over lubrication, the downtime due to maintenance; and the downtime due to failure of wheels, rollers and bearings.

U.S. Pat. No. 4,295,803 by Barthelmess for SEPARATING MACHINE issued on Oct. 20, 1981 teaches a cylindrical rotor comprising two rotor rings connected by fins. The cylindrical rotor is suspended in midair by magnetism, thus removing the need for any mechanical contact and therefore any frictional loads or losses due to such contact between the rotor and any support mechanism. Each end ring is supported by electromagnets included in larger support rings surrounding the two rotor rings. Position sensors are located near the supporting electromagnets in the larger support rings. Feedback from the sensors can be used to control the power being fed to the supporting electromagnets in order to maintain the rotor in a stable position with respect to the supporting electromagnets while the rotor is spinning. Barthelmess teaches electromagnetic support which requires electrical power and uses positional feedback to control this power. The invention in the present application teaches the use of permanent magnets rather than electromagnet. Advantages inherent in the present invention include the savings due to lack of need for electrical power, and the savings due to the lack of a need for positional feedback or for a complex control system for the electrical power for the magnets.

U.S. Pat. No. 4,471,664 by Wyatt for MAGNETICALLY SUPPORTED WORK FIXTURE issued on Sep. 11, 1984 teaches a fixture which supports a work piece such as a printed circuit board, for example, on a work bed which is supported by doughnut shaped permanent magnets so that the work bed along with the attached work piece may easily and without friction be spun around in a horizontal reference frame, as desired. Further, when desired, an adjacent tool such as a riveting tool may be brought into position with respect to the work piece and apply some necessary pressure to the work piece as may be caused by riveting for example, without stressing or fracturing the work piece. Because the work bed and attached workpiece are floating on a magnetic field, external forces applied to the board result in the work bed and workpiece moving up or down by a slight amount rather than the work piece being stressed against an otherwise immovable work bed. Wyatt teaches a spinning work bed whose rotational axis is oriented vertically. Wyatt would not support a spinning cylinder whose axis is oriented horizontally as does the present invention.

SUMMARY OF THE INVENTION

The present invention comprises, consists of and/or consists essentially of a rotary drum dryer is supported by magnetic non-contact bearings rather than by rollers or wheels which are normally used to support a rotary drum cylinder. A plurality of rare earth permanent magnets are positioned on the outside surface of the cylindrical dryer to form at least two external annular rings. One U-shaped semi-circular channel supported with a cradle have similar rare earth permanent magnets positioned at selected locations on the inside curvature thereof with the open end facing upward and disposed below in alignment with and spaced apart from each one of the at least two annular rings of magnets supporting the on the cylindrical dryer. The rear earth permanent magnets affixed to the outer periphery of the cylinder are positioned with a selected pole, for example the north pole, facing outwardly away from the cylinder. The permanent rare earth magnets on the inside of the U-shaped channels of the support cradle then have the same pole, the north pole in this example, facing inwardly toward the cylindrical dryer supported thereon. The like pole magnets affixed to the surface of the cylinder repel the like pole magnets facing them disposed in the U-channels of the cradle causing the cylinder to levitate above and spaced apart a selected distance from the cradle. The like pole magnets affixed to the surface of the cylinder repel the like pole magnets facing them disposed in the U-channels of the cradle causing the cylinder to levitate above and spaced apart a selected distance from the cradle.

More particularly, the present invention, there is provided a rotary drum system allowing throughput of process material from an inlet end to an outlet end comprising a cylindrical drum capable of being heated, cooled, run at ambient temperature, or maintained at a specific desired temperature being situated with the rotational axis being substantially horizontal or at a slight angle to provide gravitation throughput. The dryer includes an entry or feed port or opening on one end or a selected location and one or more exit or discharge openings for removal of the processed substrate. Typically, a higher open end is an inlet for the process material and the lower open end is an outlet for the process material. The drum or dryer has a plurality of evenly spaced first magnets affixed circumferentially thereto at a selected position forming at least two spaced apart parallel circumferential magnet support rings. Each of the at least two rings encircles the exterior surface or wall of the drum. The at least two rings are spaced along the length of the drum spaced apart from one another to provide a stable base. All of the magnets affixed to the exterior of the drum may also be disposed or affixed to a collar which may be permanent or removably attached to the external surface of the drum dryer, wherein the magnets disposed within the collar or ring are positioned with the same pole facing outwardly from the surface of the drum. At least two arcuate shaped channels support members extend upward from a base farming cradle, wherein the channels have a plurality of second permanent rare earth magnets affixed in a semicircle disposed within the U-shaped channel support members. Each of the permanent rare earth magnets within the channel has the same like pole of the ring magnets except that the channel magnets face inwardly toward the drum. The at least two U-channel support members provide at least a partial semicircle of second permanent rare earth magnets spaced apart and parallel from one another in cooperable alignment with the at least two rings of first magnets affixed to the drum so that like poles of the second magnets repel adjacent the first magnets and cause the drum to levitate above the U-channel supports. The rotary drum dryer has an axial and/or coaxial stabilizer means. The rotary drum dryer also has an optional magnetic means of producing rotation of the drum.

It is an object of this invention to provide a rotational support system for a rotary drum or cylinder which is a non-contact vertical support system wherein vertical support is provided by permanent magnets which suspend the rotating drum in mid-air.

It is an object of this invention to provide a rotational support system for a rotary drum dryer or cylinder which provides frictionless rotational support for a rotary drum.

It is an object of the present invention to provide a magnetic support system for rotary drum dryers which requires no lubrication or does not exhibit wear on the support bearing member.

It is an object to provide a magnetic bearing support means which is almost frictionless and reduces energy costs, is quiet, spreads the support stress over a large area to increase longitivity, includes a high tolerance of imbalance of process substrate.

It is an object of the present invention to define rotary drum equipment as including dryers, cylindrical processing machines such as kilns, ballmills, mixers, cookers, blenders, incinerators, calendars, tumblers, centrifugal and axial fans.

It is an object of this invention to provide a rotational support system for a rotary drum or cylinder which eliminates the need for rotational support wheels, rollers and bearings, and therefore eliminates the need for spare parts, maintenance and downtime associated with these rotational support wheels, rollers and bearings.

It is an object of this invention to provide a rotational support system for a rotary drum or cylinder which greatly reduces or eliminates vibration in a rotating cylinder due to the fact that with no direct mechanical contact for vertical support, any vibrations are absorbed because the cylinder is floating in the air.

It is an object of this invention to provide a rotational support system for a rotary drum or cylinder which is stable in all directions except in the axial direction and therefore must have some form of axial stabilization, and wherein axial stabilization may be achieved with at least one magnetic thrust bearing at a selected end, a magnetic thrust bearing on opposing distal ends, or one or more annular ring or rings attached away from the ends of the drum which may be used alone or together with one or more distal end axial thrust bearings.

It is an object of this invention to provide a rotational support system for a rotary drum or cylinder which spreads out the stress on a drum due to a large array of magnets supporting the weight of the drum spread out over at least two 180 degree arcs across the bottom of the drum as opposed to at least four rollers on which the drum rolls.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

Figure 1:
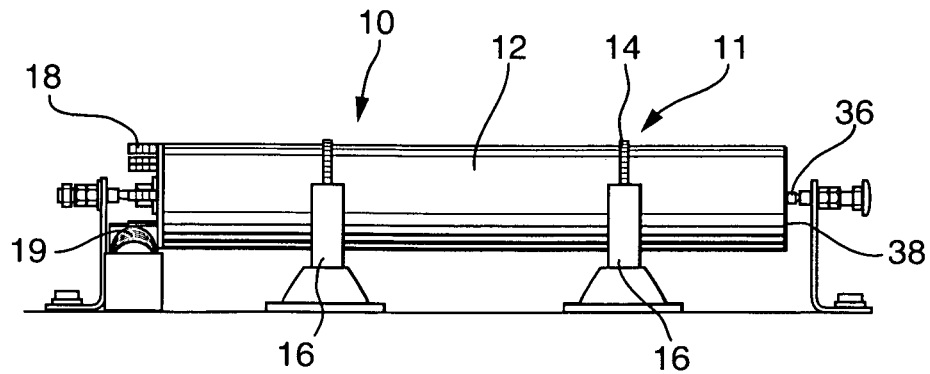
FIG. 1 is a front view of a rotary drum of the present invention.
Figure 2:
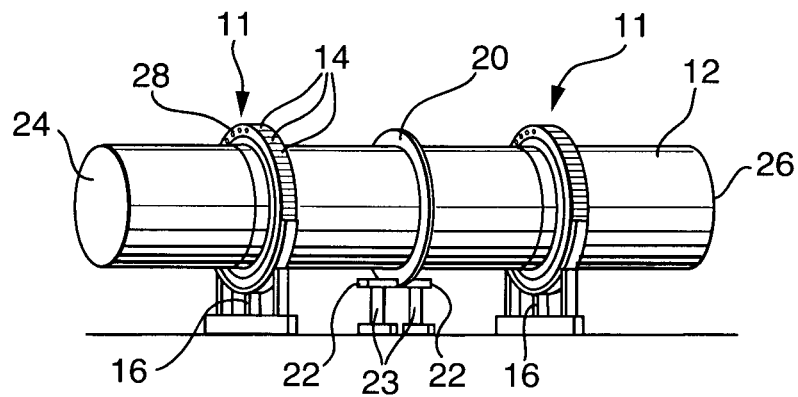
FIG. 2 is front perspective view of a rotary drum using axial stabilizer rollers.

In accordance with the present invention, there is provided non-contact magnetic bearing vertical support system for industrial rotary drums which may include a plurality of flanges, baffles, heating (steam tubes, circulating liquid or electric heating or cooling elements to control the environment of or treat the substrate therein or agitate, mix, or disperse the substrate therein. FIGS. 1 and 2 shown examples of a cylindrical rotary drum 12 with and feed inlet end 24 and a discharge outlet end 26. At least 2 annular collars or rings 28 extend coaxially or encircle drum 12 and are permanently or removably attached to the external surface of the drum body to provide both structural strength and function as a support member. A plurality of permanent rare earth type magnets 14 preferably of a selected size and strength are affixed to the annular rings 28 forming magnetic support rings 11. It is contemplated that the magnets 14 c an be affixed directly to the exterior cylindrical walls of the rotary dryer. The magnets 14 are powerful and preferably are rare earth magnets 14 which are typically square or rectangular in shape and are positioned adjacent to one another to form rings 11. At least one pair of spaced apart base member each one comprising a cradle supports a generally U-shaped channel 16 which also include a plurality of permanent magnets 17, preferably rare earth magnets. Each of the two magnetic rings 11 of magnets 14 on the external surface of drum 12 are preferably positioned approximately one quarter of the way from each end of drum 12 to provide for balanced and even support. Annular rings 28 spread the load from magnets 14 around the drum 12, as opposed to the point contact made by less desirable systems using at least four rollers for support of the drum 12. The base members and cradles supporting the U-channel support members 16 are positioned so that the magnets 17 are adjacent to and directly under the rings 11 of magnets 14 wherein the rings are suspended spaced apart from and in axial alignment with the magnetic rings 11. The rotary drum does not physically touch the magnets supported by the cradle that extend around the bottom portion of the rotary drum.

Where three rings 11 are used to support a drum12, one ring 11 is placed in the center of drum 12 and, preferably, the other two rings are proportionally spaced apart from each other extending from each end. With this spacing, each support ring 11 carries and is centered under each third of the drum12. Where more than three rings 11 are used to support drum 12, selected spacing of rings 12 is determined to spread the load evenly among the rings.

Figure 4:
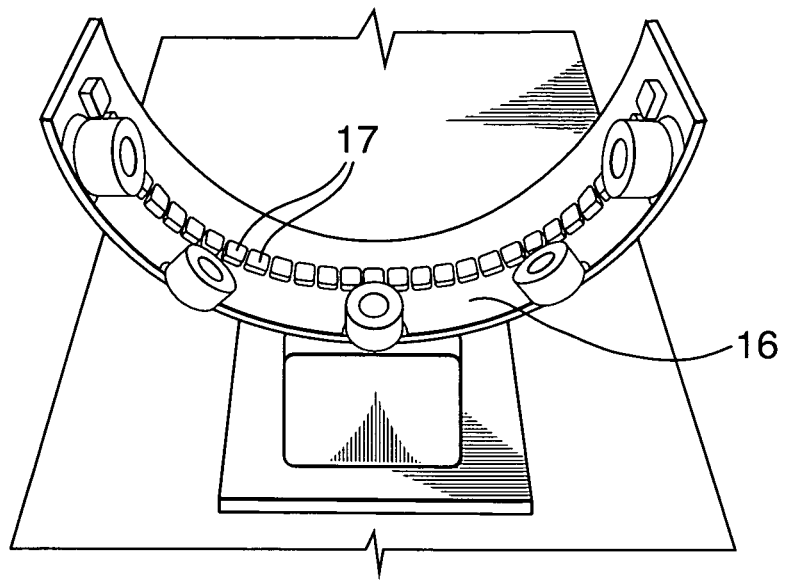
FIG. 4 is a top perspective view of a U-channel support member with support magnets affixed thereto.
Figure 5:
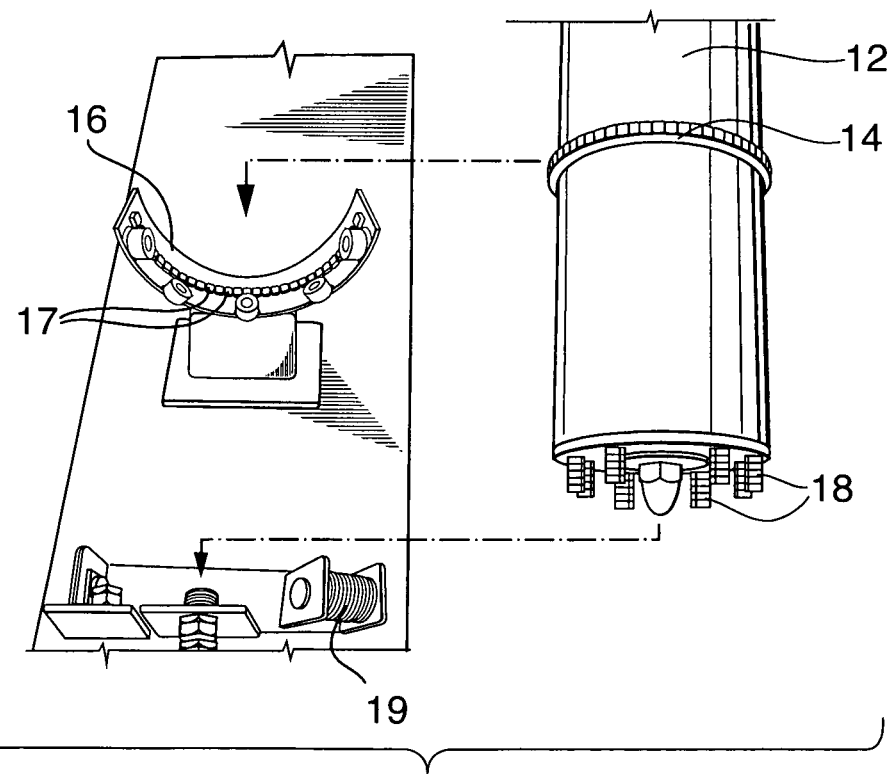
FIG. 5 is top view of a first example of a non-contact rotary drum and U-channel support structure.

Whereas the effective arc length of the magnetic support provided by the U-channels and magnets 17 is 180 degrees, as depicted in FIGS. 4 and 5, it is anticipated that a range of acceptable arc lengths is about 90 to 270 degrees, and more preferably from 120-180 degrees, and more preferably form 120-150 degrees. For instance, cradle magnets arranged in a 180 degree semi-circular pattern around the ring magnets reduces the axial thrust load by 50% compared to a cradle of magnets completely encircling the magnet ring. However, it can be seen that unless the magnets 14 are located exactly over the magnets 17, the drum will tend to move toward the direction of imbalance and thus the cylinder needs axial stability as previously described. It can also be stated that longer the arc length of magnets in the U-channel, the greater the tendency for the drum to move axially toward the side of imbalance because the magnets 14 repel the magnets 17. Therefore, a smaller supporting arc of magnets in the U-channel is desirable to decrease the tendency for axial instability. However, decreasing the number of supporting bearings decreases the amount that can be supported vertically. Therefore a tradeoff exists between having fewer magnets for increased axial stability and having more magnets for increased vertical supporting strength. One preferred arc length is about 150-180 degrees.

As previously stated, the axis of rotation is slightly tilted is many examples of a drum, but due to the use of internal spiraling or helical fins or ribs on the internal surface of the cylinder, the axis of rotation is level or is even configured so that the process material actually flows up hill. In the case of a rotational axis which is tilted for downward flow, the angle of tilt is slight, that is, preferably in the range of 1-10 degrees.

The magnets 14 and 17 are preferably neodymium magnets, which are a member of the Rare Earth magnet family and are thought to be the most powerful permanent magnets in the world. Referred to as NdFeB magnets, or NIB, because they are composed mainly of Neodymium (Nd), Iron (Fe) and Boron (B), these magnets are a relatively new invention and have only recently become affordable for everyday use. K & J MAGNETIC, INC markets neodymium magnets of varying sizes and strengths. A 2 inch by 2 inch by 1 inch magnet has an attraction strength of over 300 pounds. It can be seen that a plurality of such magnets in repulsive alignment with one another can give a combined lifting power limited only by the number of magnets which are attached to the drum 12 and U-channel support member 16.

Other preferred embodiments of the present invention include magnets made from samarium cobalt. Still other preferred embodiments of the present invention include magnets made from alnico, an alloy of aluminum, nickel and cobalt.

Magnets 14 are each affixed to the drum 12 so that the same pole, for example, the north pole, faces outward from the surface of drum 12. All of the magnets 17 in the U-shaped channel 16 have the same pole facing inward, for example the north pole, as the magnets 14 have facing outward from drum 12. In this manner, when drum 12 is brought into position with the rings 11 of magnets 14 being directly over the semi-circles of magnets 17, the magnets 17 repel the magnets 14 and thus, drum 12 is levitated in midair inside U-channels 16.

It can be seen that in this situation, the drum 12 may move axially in one direction or the other beyond a point where magnets 14 are not above magnets 17, at which point the drum 12 lowers and comes into physical contact with magnets 17. In the article 'Design Formulas for Permanent-Magnet Bearings' on pages 734-738 in Volume 25 of the Transactions of the ASME dated December 2003, which is hereby incorporated herein in its entirety, Paden et al state in their introduction, "As a consequence of Earnshaw's theorem, it is not possible to levitate a body statically solely with permanent magnets in a static magnetic field. Indeed, a radial PM (permanent magnet) bearing has a negative axial stiffness, which has twice the magnitude of the radial stiffness. As a consequence, PM bearings are always used in conjunction with other bearings. In the case of radial PM bearings, there is often an active thrust magnetic bearing used for positioning in the axial direction."

Therefore, there is a need for axial stabilization of drum 12 to maintain the magnets 14 directly over the magnets 17. FIG. 2 shows one preferred example of such axial stabilization means. An annular ring 20 is rigidly affixed to and extends radially from the center wall of drum 12. Rollers 22 are rotatably mounted on fixed axles 23 and are positioned with a roller 22 in rolling contact with each side of annular ring 20. In this configuration, as drum 12 spins, annular ring 20 spins. Rollers 22 are in rolling contact with the sidewalls of annular ring 20 and thus prevent drum 12 from moving axially.

Figure 3:
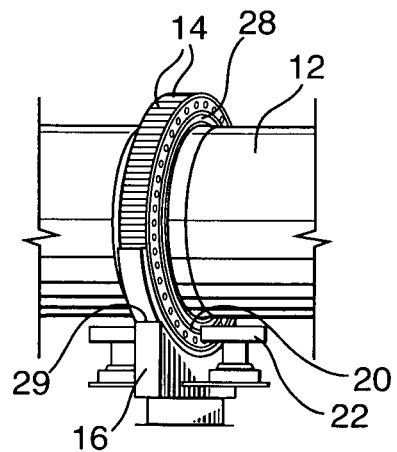
FIG. 3 is front perspective view of the rotary drum with magnets attached around the outer peripheral surface of an annular ring and wherein axial stabilizer rollers are rolling against the outer axial surface of the annular ring for axial stability.

FIG. 3 shows another preferred example of axial stabilization means. Rather than affixing a separate annular ring to the exterior wall of drum 12, there is an annular ring 28 rigidly affixed to the exterior surface of drum 12 which serves two purposes. First, annular ring 28 has support magnets 14 affixed to the outer peripheral surface. Second, rollers 22 are in rolling contact with the sidewalls 29 of annular ring 28. Therefore, annular ring 28 is providing vertical support through magnetic repelling forces of magnets 14 and 17, and annular ring 28 is providing axial stabilization by the thrust forces of sidewalls 29 against rollers 22.

A third example of axial stabilization includes an axial pin 36 thrust against a recessed axial member 38 at each end of drum 12. The axial member 38 is attached to the inner wall of drum 12 but must be configured to allow the flow of process material into the inlet and out of the outlet of drum 12. Such an axial member 38 is attached by spoke like arms to the inner wall of drum 12. The resulting drum 12 has both ends open and can therefore be used in a continuous flow process wherein material is added at the input end 24 and falls out of the outlet end 26. It was previously stated that the axis of the cylinder should be slightly un-level with the input end 24 being slightly higher than the output end 26. However, another preferred embodiment includes a drum 12 which is level but includes interior helical ribbing, walls or fins attached to the interior surface of the drum 12 which cause the process material to migrate toward the output end as the drum is rotated.

Figure 6:
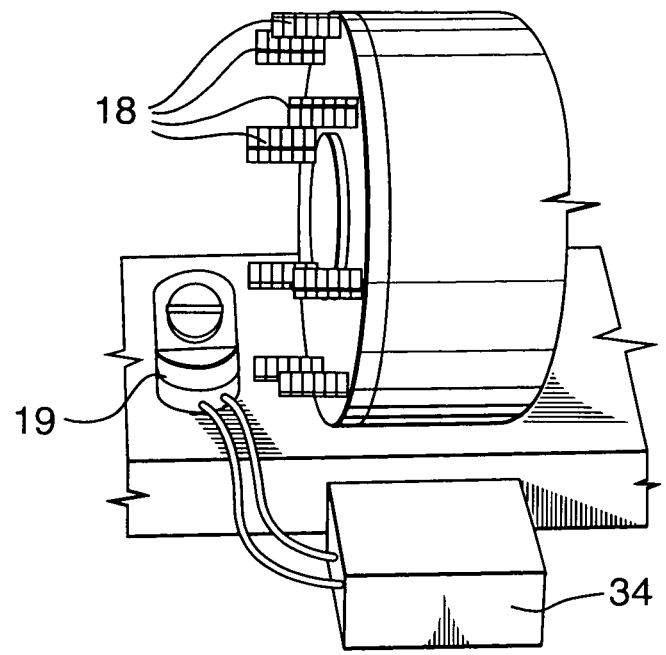
FIG. 6 is a top perspective view of a first example of a non-contact rotary drum drive including attached magnets and a nearby electromagnetic coil.

Shown in FIGS. 1, 5 and 6 is a first non-contact means of imparting spinning motion to drum 12. Magnets 18 are affixed in a selected number of evenly spaced positions, for example eight spacings as shown in FIG. 6, around the periphery of drum 12. An electromagnetic coil 19 is fixed near enough to the magnets 18 that when a momentary pulse of current is passed through coil 19 by controller 34, one of the magnets 18 is then repelled by coil 19. As magnet 18 is pulled toward coil 19, this will cause drum 12 to spin. Fixed coil 19 must be far enough away from magnets 18 that, as drum 12 spins, magnets 18 do not come into physical contact with coil 19. As magnet 18 passes by coil 19, controller 34 will then pulse coil 19 again to repel the next oncoming magnet 18 to further cause drum 12 to spin. As these current pulses are sent by controller 34 to coil 19, drum 12 speeds up and the frequency of the pulses must be increased to speed the drum 12 even more. The controller is programmed to ramp up to a selected frequency which corresponds to a particular rotational speed as desired and the drum 12 will then continue to rotate at the desired speed. IF the current in coil 19 is reversed, then the magnet 18 will then be attracted. A controller can use this feature to further cause rotation of the drum 12.

Magnets 13, 14, 17, and 18 can be affixed to corresponding members simply by magnetic attractive force or, if desired by other means such as adhesive, or fasteners such as screws, bolts, rivets or the like.

Figure 7:
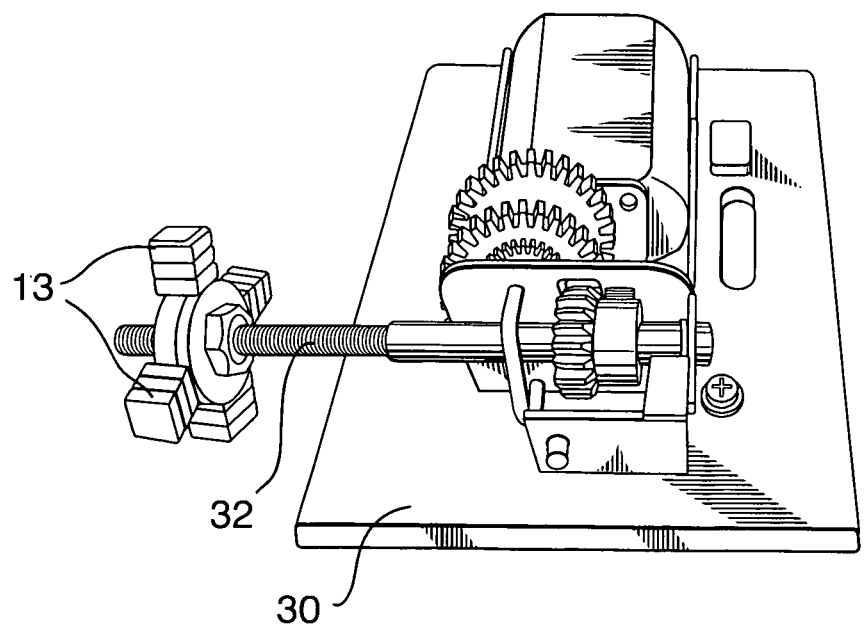
FIG. 7 is a top perspective view of a second example of a non-contact rotary drum drive including attached magnets and a nearby magnets affixed radially to a motor driven shaft.
Figure 8:
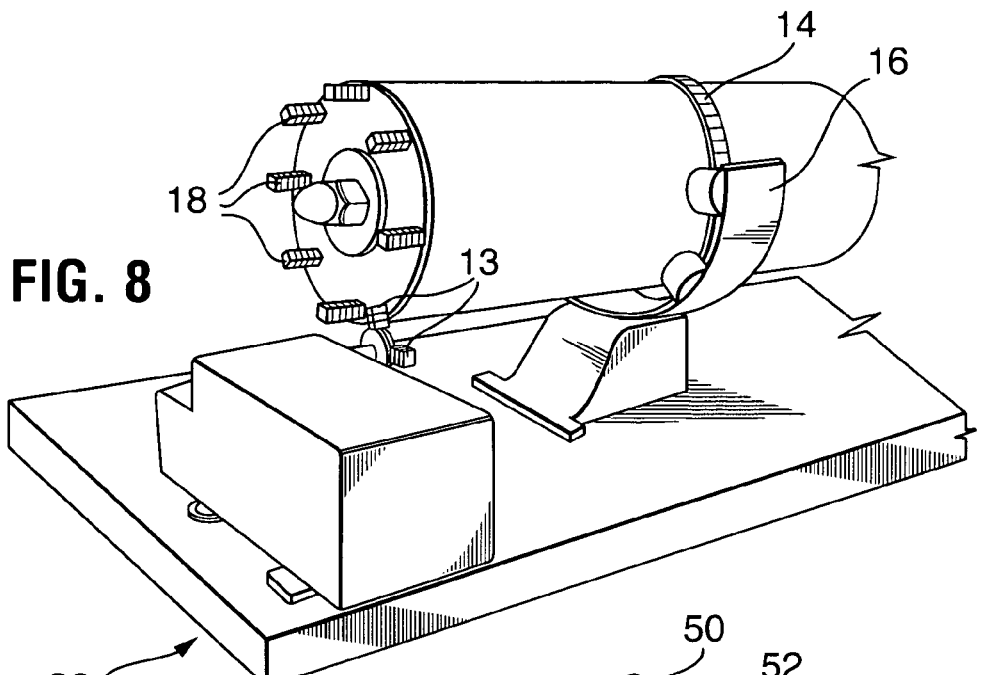
FIG. 8 is a front perspective view of a rotary drum driven by the non-contact means of FIG. 7.

A second non-contact means of causing spinning motion of drum 12 is shown in FIGS. 7 and 8. A number of evenly spaced magnets 18 are affixed to the periphery of drum 12 as in the first non-contact means of imparting spinning motion explained above. Rather than using a pulsed coil to repel magnets 18, magnets 13 are spaced around the periphery of shaft 32 which is caused to rotate by motor and gear set 30 in FIG. 7. When shaft 32 is brought into a position where magnets 13 can almost physically contact magnets 18, magnets 13 will repel magnets 18. As motor and gear set 30 causes shaft 32 to spin, magnets 18 will be repelled one at a time to the magnets 13 as they rotate by in a circle. This repulsion of magnets 18 to magnets 13 will cause drum 12 to spin. The speed of the drum 12 will be directly controlled by the speed of the motor and gear set 30.

Figure 10:
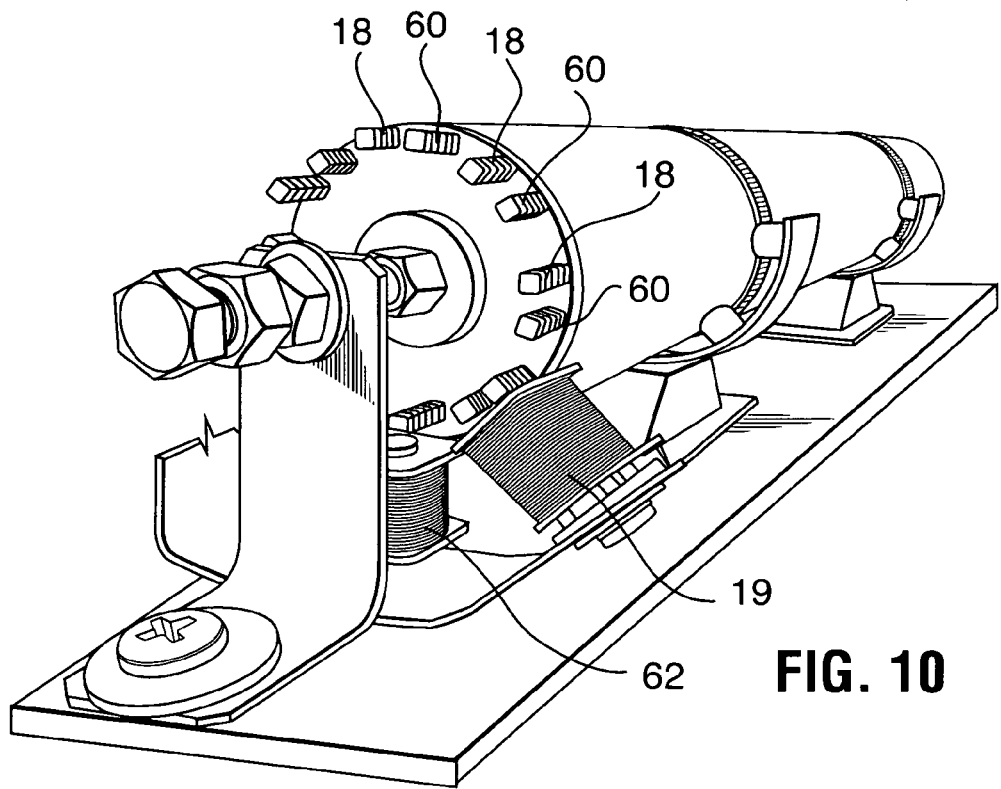
FIG. 10 is an end view of another embodiment of the present invention including twice the number of propelling magnets around the periphery of the end of the cylinder.
Figure 11:
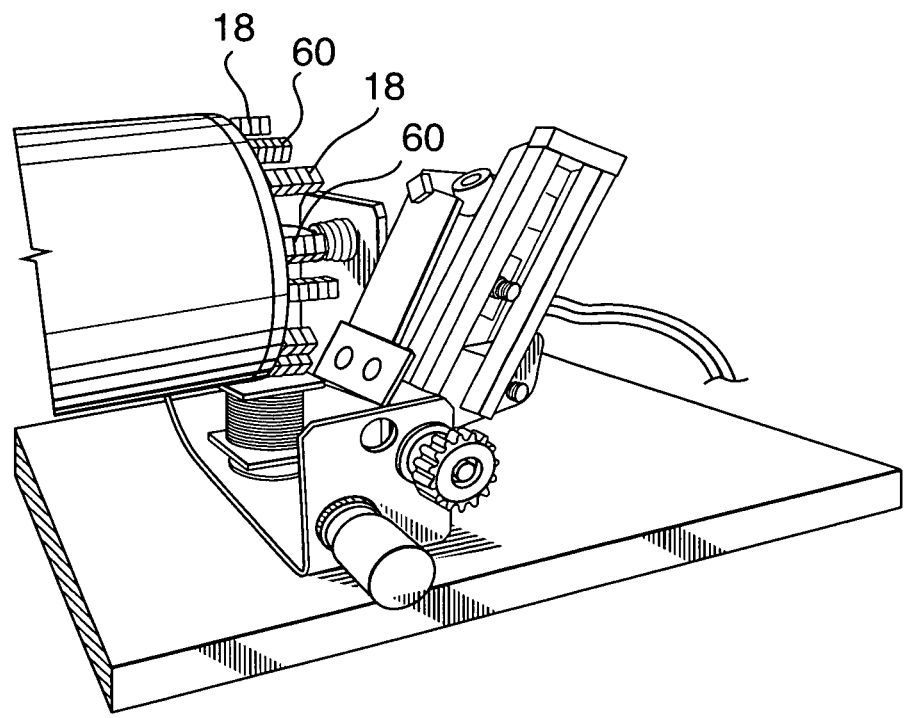
FIG. 11 is a side view of the embodiment of FIG. 10.
Figure 12:
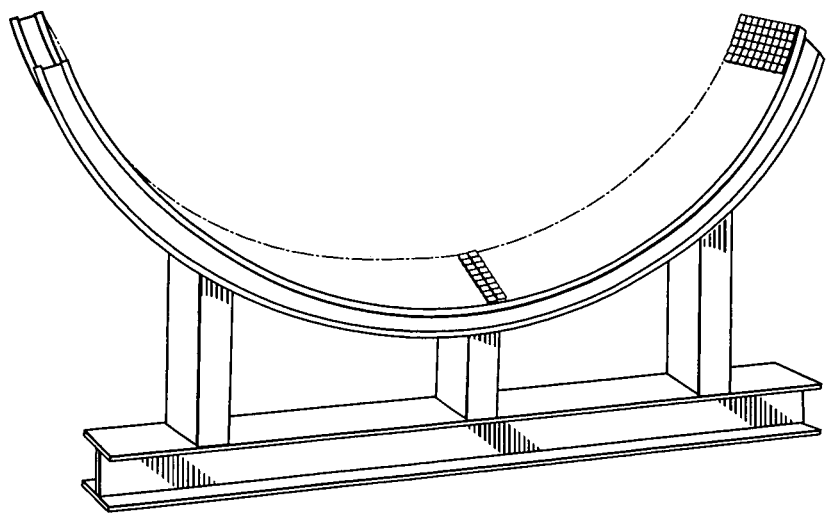
FIG. 12 is a perspective view of a base including an arcuate cradle having a magnetic array disposed therein.
Figure 13:
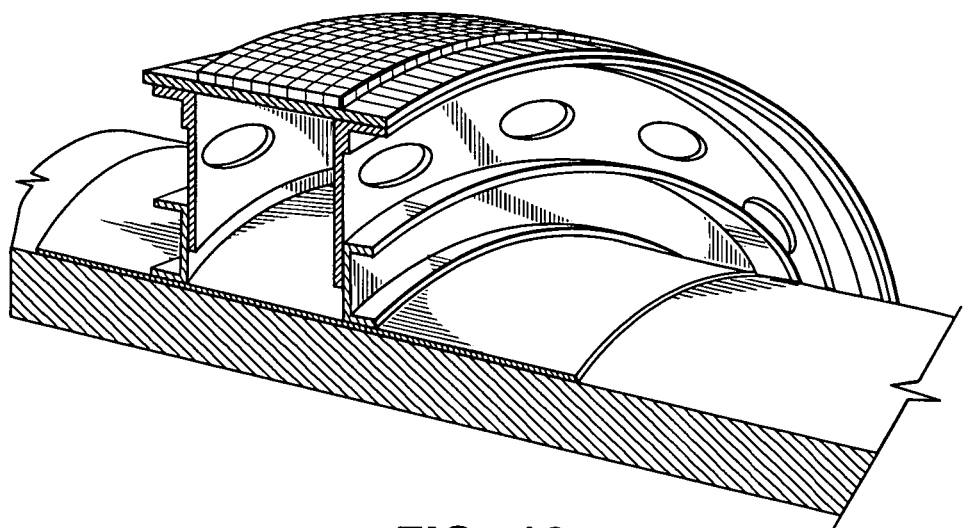
FIG. 13 is a perspective view of an annular ring mounting to a cylindrical drum including an array of magnets affixed to the outer periphery of the ring.
Figure 14:
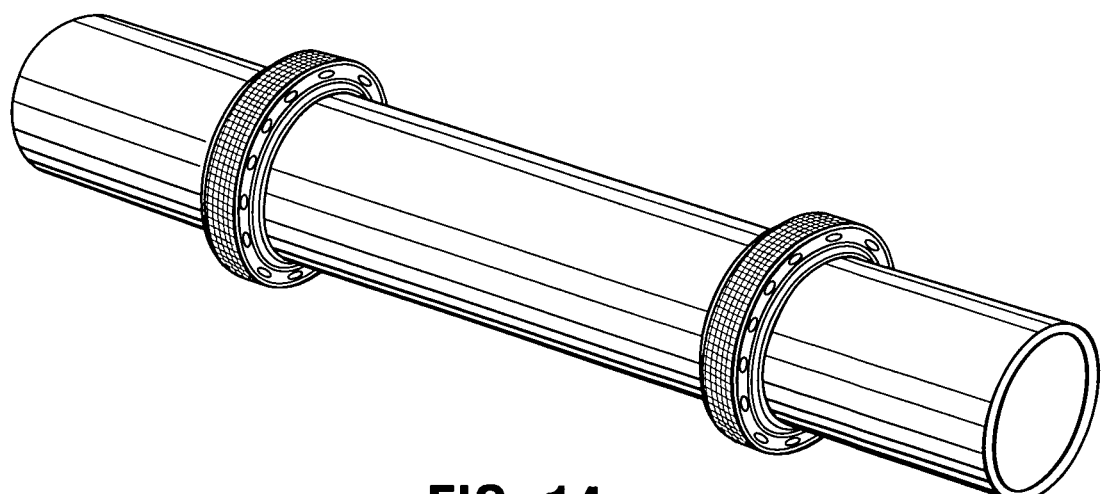
FIG. 14 is a perspective view of a rotary drum including a pair or angular rings mounted thereto.
Figures 15, 16, 17, 18:
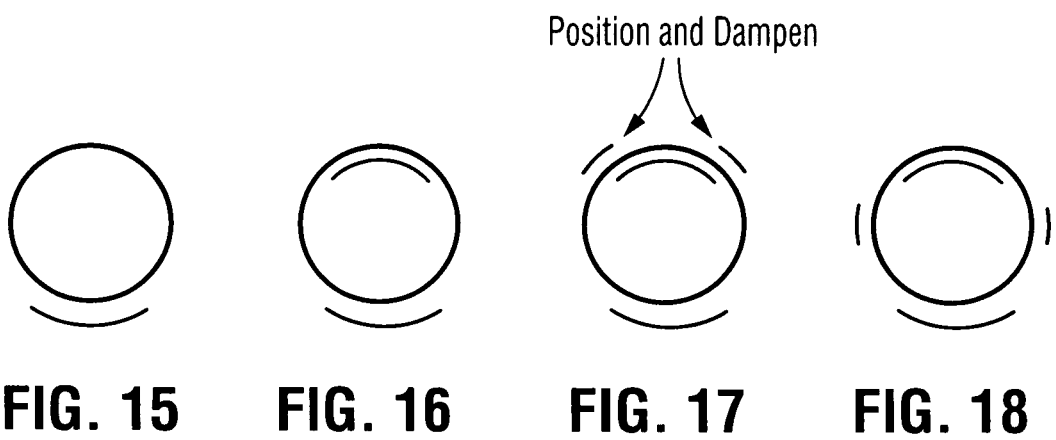
FIG. 15 is a sketch showing an end view of alternate arrangements of magnetic rings and supports wherein a single outside diameter lower ring is utilized for support.
FIG. 16 is a sketch showing an end view of alternate arrangements of magnetic rings and supports wherein a single outside diameter lower ring and internal diameter ring are utilized for support.
FIG. 17 is a sketch showing an end view of alternate arrangements of magnetic rings and supports wherein a single outside diameter lower ring is utilized for support together with a pair of offset upper outside diameter rings.
FIG. 18 is a sketch showing an end view of alternate arrangements of magnetic rings and supports wherein a single outside diameter lower ring is utilized for support together with an inner upper ring and opposing outer side ring supports.
Figure 19:
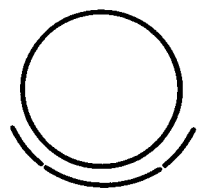
FIG. 19 is a sketch showing an end view of alternate arrangements of magnetic rings and supports wherein a group of three outside diameter lower rings are utilized for support.

In FIGS. 6 and 8, it can be seen that the evenly spaced magnets 18, all with the same pole extending radially outwards, are fixed at an end of drum 12. However, magnets 18 can be fixed in a ring anywhere along the length of drum 12 and the driving member, either the coil 19 or the motor and gear set 30, can be properly positioned to cause drum 12 to spin. It is anticipated that the number of magnets 18 can be increased or decreased to effectively increase or decrease the maximum speed of a given drive unit such as unit 30. FIGS. 10 and 11 show a drive unit similar to that shown in FIG. 5 but including a second electromagnetic coil 62 which increases the pulling power and therefore the torque of the drive unit. Further, a number of magnets 60 equal to the number of magnets 18 have been added, one between each pair of magnets 18. The magnets 60 have the opposite pole extending radially outwards from the cylinder and can therefore be used along with the coils to increase the speed or driving torque as desired.

Figure 9:
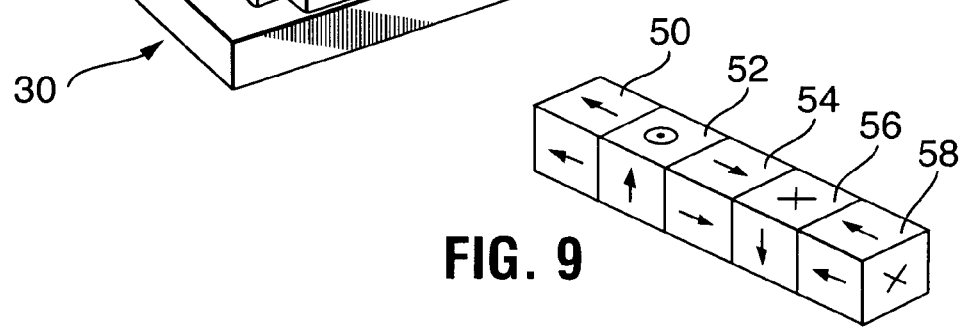
FIG. 9 is a perspective view of five magnetic cubes arrange in a Halbach array.

FIG. 9 shows a configuration of magnets referred to as a HALBACH ARRAY. A selected number of magnets, "Five" magnets or a selected size and shape, for example, cube shaped magnets, 50-58, are arranged in a special configuration, as shown. Magnet 50 has the north pole facing left. Magnet 52 has the north pole facing upwards. Magnet 54 has the north pole facing to the right. Magnet 56 has the north pole facing downwards. Finally, magnet 58 has the north pole facing to the left again. With these five magnets held against each other in the configuration described above, almost all of the magnetic flux lines extend downward and almost no magnetic flux lines extend upward. This means that the top sides of the five magnets will hardly attract iron at all. More importantly, the bottom sides of the magnets will have double the attraction to iron as when not in the HALBACH configuration. This configuration is used in many known devices of today such as the magnetic strips in refrigerator door gaskets and magnetic cards used to hold pictures or advertisements on kitchen appliances. In this configuration, only one side of the magnetic strips is magnetic. Therefore, another preferred embodiment of the present invention includes HALBACH arrays arranged in at least two annular rings and at least two arcs situated within the U-channels. Such an arrangement will give roughly double the lifting power for a given number of magnets.

It is anticipated that magnets used in the magnetic bearings of the present invention are may be massive and that a ring of such magnets can cause imbalance of the drum 12 and change the resulting center of gravity. Movement of the ring of magnets and the adjacent U-channel is required to restore balance so that the cylinder doesn't tip down at one end or the other. Moreover, imbalance is advantageous at times such as when a 'trommel' or separator has different materials exiting at different distances from the center of the axis of rotation, or when, in the case of a dryer, the material entering the drum is lighter than the material leaving the drum. In these situations, it may be advantageous to move the magnets away from the apparent ideal location.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. A rotary drum system allowing throughput of process material from an input end to an output end comprising:
   a cylindrical drum configured with a rotational axis being roughly horizontal, said input end and said output end being open, said input end providing an inlet for said process material and said output end providing an outlet for said process material, said cylindrical drum having a plurality of first magnets affixed thereto and positioned to form at least two spaced apart rings encircling an exterior surface of said drum, said at least two rings being spaced along the length of said drum to provide even and balanced vertical support, all of said magnets being positioned with the same pole facing outwards from said exterior surface of said drum;
   at least two U-channel support members wherein an open end of said U-channel support members faces upwards, each U-channel support member having a plurality of second magnets affixed in an arc inside said U-channel support member, each of said second magnets having the same pole facing inwards with respect to said U-channel as that pole of said first magnets facing outwards from said drum, said at least two U-channel support members having said arc of second magnets being positioned directly under said at least two rings of said first magnets affixed to said drum so that like poles of the said second magnets repel adjacent said first magnets and cause said drum to levitate above said U-channel supports;
   an axial stabilizer means; and
   a means of causing spinning motion of said drum.

2. The rotary drum system of claim 1 wherein said roughly horizontal rotational axis is slightly tilted so that said input end is higher than said output end, a tilt angle of said axis being in the range of 1-5 degrees.

3. The rotary drum system of claim 1 wherein said axial stabilizer includes an annular ring extending from the external surface of said drum, a first roller and a second roller, said annular ring having a first lateral side perpendicular to said exterior surface of said drum, said annular ring having a second lateral side perpendicular to said exterior surface of said drum, said first lateral side and said second lateral side being parallel to one another, said first roller rolling against said first lateral side of said annular ring, and said second roller rolling against said second lateral side of said annular ring, the axis of said first roller and said second roller being fixed with respect to said drum.

4. The rotary drum system of claim 1 wherein said arc of second magnets has an arc length of 120 to 270 degrees.

5. The rotary drum system of claim 1 wherein said arc of second magnets has an arc length of about 180 degrees.

* * * * *